United States Patent [19]
Goto

[11] Patent Number: 5,177,425
[45] Date of Patent: Jan. 5, 1993

[54] METHOD OF CHARGING AND DISCHARGING BATTERY AND POWER SOURCE APPARATUS ADOPTING THE SAME

[75] Inventor: Kenji Goto, Shizuoka, Japan

[73] Assignee: Toyota Jidosha Kabushiki Kaisha, Toyota, Japan

[21] Appl. No.: 372,601

[22] Filed: Jun. 28, 1989

[30] Foreign Application Priority Data

Jul. 1, 1988 [JP] Japan ................ 63-164167

[51] Int. Cl.$^5$ .............................................. H02J 7/00
[52] U.S. Cl. ........................................... 320/6; 320/14
[58] Field of Search .............. 320/5, 6, 8, 13, 14, 320/19, 15, 16, 17, 18

[56] References Cited

U.S. PATENT DOCUMENTS

| | | | |
|---|---|---|---|
| 3,987,352 | 10/1976 | Hirota | 320/19 X |
| 3,997,830 | 12/1976 | Newell et al. | 320/14 X |
| 4,303,877 | 12/1981 | Meinhold | 320/18 X |
| 4,349,773 | 9/1982 | Hartmann et al. | 320/5 |
| 4,564,798 | 1/1986 | Young | 320/6 |
| 4,616,170 | 10/1986 | Urstoger | 320/14 X |
| 4,857,419 | 8/1989 | Jinnai et al. | 320/14 X |

FOREIGN PATENT DOCUMENTS

| | | |
|---|---|---|
| 3317531 | 11/1983 | Fed. Rep. of Germany . |
| 56-28476 | 3/1981 | Japan . |
| 56-132775 | 10/1981 | Japan . |
| 60-49577 | 3/1985 | Japan . |
| 60-124371 | 7/1985 | Japan . |
| 60-124372 | 7/1985 | Japan . |
| 62-144066 | 9/1987 | Japan . |

Primary Examiner—Emanuel T. Voeltz
Assistant Examiner—Knstine Peckman
Attorney, Agent, or Firm—Cushman, Darby & Cushman

[57] ABSTRACT

A battery is divided into a plurality of battery blocks. An amount of current flowing into a coil is rapidly changed by a switching element so as to raise the output voltage of one battery block. The power of the battery block is transferred to another battery block by utilizing the thus-raised voltage. This operation is subsequently repeated for each battert block. Thus, all the blocks are subsequently completely discharged for achieving the equalization of the amount of charge of each block.

15 Claims, 10 Drawing Sheets

METHOD OF CHARGING AND DISCHARGING BATTERY AND POWER SOURCE APPARATUS ADOPTING THE SAME

BACKGROUND OF THE INVENTION

1. Field of the Invention

The present invention relates to a method of charging and discharging a battery having a plurality of electrochemical cells which dissolve an active material from the electrodes into the electrolyte during the discharging process and deposit the active material on the surfaces of the electrodes during the charging process and an apparatus adopting this method. More particularly, the present invention relates to such a method and apparatus for achieving full discharge in order to equalize the electrodes.

2. Description of the Prior Art

In the apparatus such as an electric vehicle which supplies an electric power to the load by using a battery, it is very important in terms of the performance of the apparatus to enlarge the capacity and prolong the life of the battery.

As a battery which is capable of effectively supplying a large capacity of electric power, a metal-halogen battery such as a zinc-bromine battery having a plurality of electrochemical cells which dissolve an active material from the electrodes into the electrolyte during the discharging process and deposit the active material on the surfaces of the electrodes in the charging process has been developed. A battery of this system is disclosed in, for example, Japanese Patent Laid-Open No. 132775/1981. The prior art will be explained in the following with reference to FIG. 12.

Figure 12:
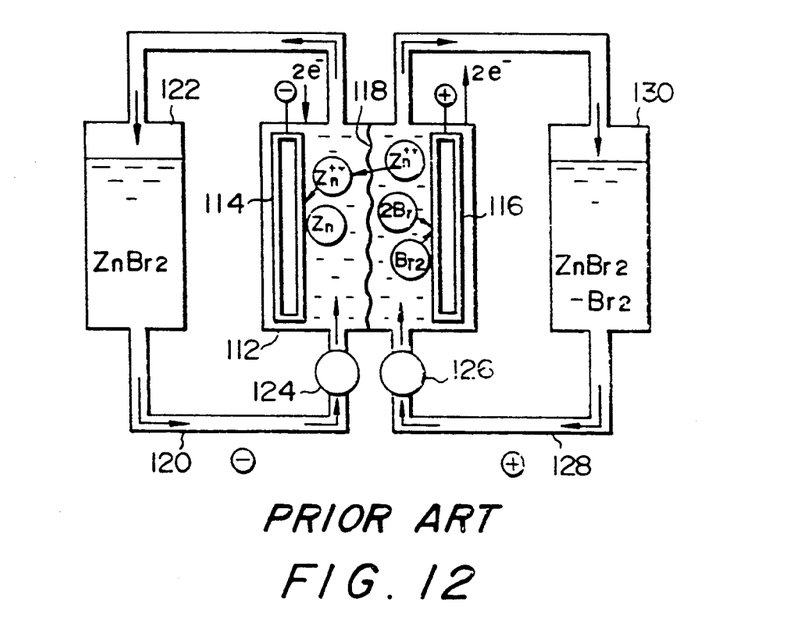
FIG. 12 shows the structure of a metal-halogen battery in the prior art.

In FIG. 12, the reference numeral 112 represents a container of a electrochemical cell which is a structural unit of a battery. The container 112 accommodates a negative electrode 114, a positive electrode 116 and a separator film 118 for separating the negative electrode 114 and the positive electrode 116 from each other.

To the negative electrode 114, an electrolyte on the negative electrode side is supplied from an electrolyte tank 122 through a pipe 120 and a pump 124, and to the positive electrode 116, an electrolyte on the positive electrode side is supplied from an electrolyte tank 130 through a pipe 128 and a pump 126. The electrolyte tank 130 on the positive electrode side may accommodate a complex tank (not shown) which stores bromine in the form of a complex. The positive electrode 116 and the negative electrode 114 are composed of a conductive resin material such as carbon plastic for the purpose of lightening the weight.

In such a cell, during charging, the $Zn^{2+}$ ions in the electrolyte are deposited on the negative electrode 114 as Zn, and $Br^-$ ions are changed into $Br_2$ on the side of the positive electrode 116 and dispersed in the electrolyte in the form of a complex. On the other hand, during discharging, Zn deposited on the negative electrode 114 dissolves in the electrolyte in the form of $Zn^{2+}$ ions, and $Br_2$ dissolves in the electrolyte in the form of $Br^-$ ions A battery practically used is composed of a multiplicity of such cells laminated in series in order to obtain a desired output voltage.

In this case, it is only the containers 112, the negative electrodes 114, the positive electrodes 116 and the separator films 118 that are laminated as the cells, and the pipes 120 and 128, the electrolyte tanks 122 and 130 and the pumps 124 and 126, etc. are not laminated but used in common.

In the above-described battery, the configurations of the negative electrodes and the positive electrodes and the natures of the separator films slightly differ with cells. For this reason, the natures of the cells are not exactly the same, which disadvantageously causes a difference in amount of self-discharge.

Figure 7:
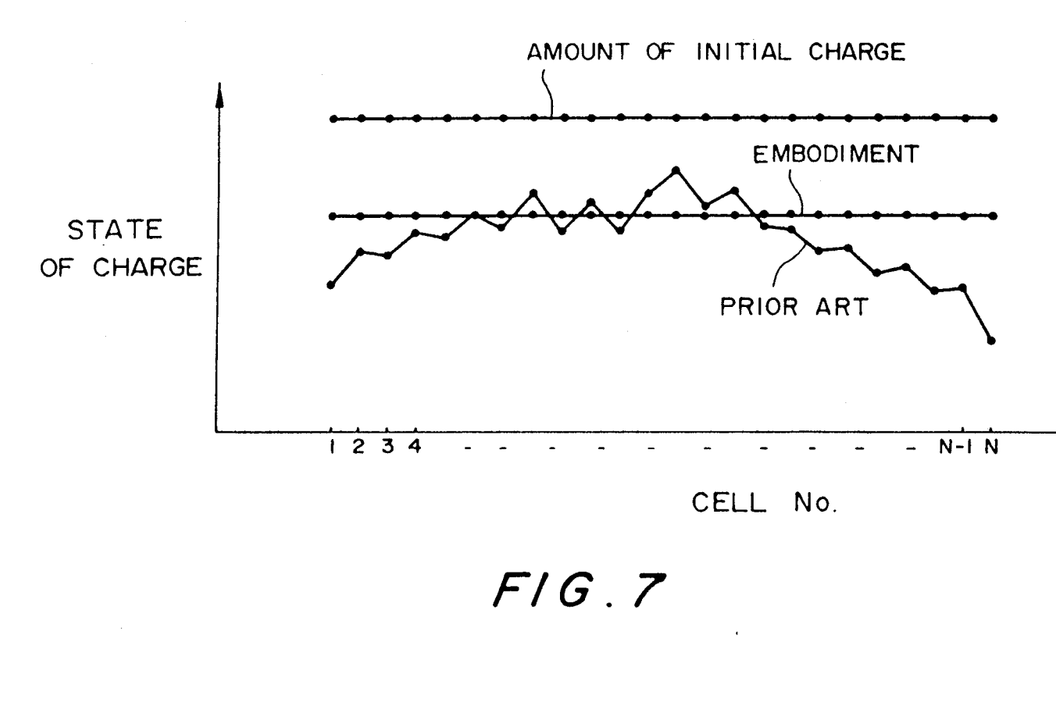
FIG. 7 is a characteristic curve showing the charged state of each electrochemical cell in the second embodiment shown in FIG. 5.

Therefore, in a battery composed of a plurality of such cells connected in series, the difference in the amount of Zn deposit, namely, the difference in the amount of charge increases with the lapse of time whether it is in operation or out of operation, as indicated by the solid line in FIG. 7. As a result, the total capacity and the voltage of the battery are reduced.

It is also known that not only is there a nonuniformity of the amount of Zn deposit between the cells, but also there is a difference in the amount of Zn deposited on the surface of the negative electrode in one cell depending on the locality, which may cause a trouble such as a breakage of the separator film due to the growth of dendrites during repetitions of charge and discharge.

Conventionally, as a measure for eliminating the nonuniformity of the amount of Zn deposit and depositing Zn on the negative electrodes to a uniform thickness (hereinunder referred to as "equalization"), the battery before charge has been fully discharged so as to dissolve the total amount of Zn deposited on the negative electrodes in the electrolyte. According to a method disclosed in Japanese Patent Laid-Open No. 132775/1981, the battery is divided into a plurality of battery blocks and the discharge current is increased for achieving full discharge in any given block in comparison with the other blocks in order to achieve the full discharge of the battery in operation. Japanese Patent Laid-Open No. 49577/1985 discloses a method of achieving the full discharge of a given one battery block in the same structure by feeding from the battery block to an auxiliary battery.

However, when these methods are applied to an electric vehicle, which generally travels a short distance per day, it is often the case that the full discharge is not achieved even in one battery block among all the blocks during operation of the battery, namely, between the completion of the charge of the battery and the initiation of the next charge.

Accordingly, if the full discharge for equalization is carried out in all the blocks of the battery, a large capacity remains in the battery and since the electric power is consumed by the auxiliary equipment, it cannot afford a sufficiently large discharge current, so that a long time is required for realizing the full discharge, which makes it impossible to prevent the growth of dendrites.

If the battery is continuously operated until the battery is sufficiently discharged in order to eliminate this problem, there is much risk of the battery dying during the operation and disabling the electric vehicle from running.

As a usage of the battery, a method of not operating all the blocks equally but fully discharging the blocks one by one may be considered. This method, however, is unsuitable for practical use, because if a part of the blocks of the battery are discharged, the blocks lose the capacity of energy supply for running, thereby greatly reducing the output of the battery and the driving performance thereafter.

Especially, in the case of an electric vehicle, since the capacity of the battery mounted thereon is limited, it is desirable that the maximum electric power is constantly supplied from all the blocks of the battery.

SUMMARY OF THE INVENTION

Accordingly, it is an object of the present invention to eliminate the above-described problems in the prior art and to provide a method of charging and discharging a battery which is capable of enabling all the blocks of the battery to experience a cycle of full discharge and charge without any external charging source by transferring the charges of any given block other than the charges consumed by the load to another part of the battery so as to be stored therein and re-charging the given block with the stored charges.

To achieve this aim, the present invention provides a method of charging and discharging a battery having a plurality of electrochemical cells which dissolve an active material such as zinc ions from the electrodes into the electrolyte in the discharging process and deposit the active material on the surfaces of the negative electrodes in the charging process, the method comprising: preparing a battery composed of a plurality of battery blocks each of which is composed of a plurality of the electrochemical cells connected in series to each other; providing a step of fully discharging any given battery block among the plurality of battery blocks by transferring the charges of the given battery block to at least one of the other battery blocks through a booster means; and repeating the step so that all the plurality of battery blocks subsequently experience at least one cycle of full discharge within a predetermined period of time.

The present invention also provides a power source apparatus comprising: electrochemical cells for dissolving an active material from the electrodes into the electrolyte in the discharging process and depositing the active material on the surfaces of the electrodes in the charging process; battery blocks each of which is composed of a plurality of the electrochemical cells connected in series to each other; a battery composed of a plurality of the battery blocks connected to each other; a booster means which is connected to any given battery block among the plurality of battery blocks for raising the output voltage of the given battery block; a charge transfer passage for connecting the output side of the booster means to at least one of the other battery blocks; and a control circuit for controlling the boosting operation of the booster means and the charges transferred through the charge transfer passage; whereby each of the battery blocks experiences at least one cycle of full discharge within a predetermined period of time.

According to the present invention, the electric power remaining in the battery block which is to be fully discharged is transferred to another battery block through the booster means, so that full discharge for equalization is carried out without causing a loss of electric power. This method can be carried out while the battery is in operation, namely, while the battery supplies electric power to the load. This method can also be carried out while the whole battery is out of operation, because there is no loss of electric power.

In other words, it is possible to equalize the whole battery without changing the state of electric power by repeating the steps of "full discharge and charging with the electric power from another battery block" subsequently for each battery block while the battery is out of operation.

The above and other objects, features and advantages of the present invention will become clear from the following description of the preferred embodiments thereof, taken in conjunction with the accompanying drawings.

DESCRIPTION OF THE PREFERRED EMBODIMENTS

The present invention will be explained hereinunder with reference to the accompanying drawings.

First Embodiment

Figure 1:
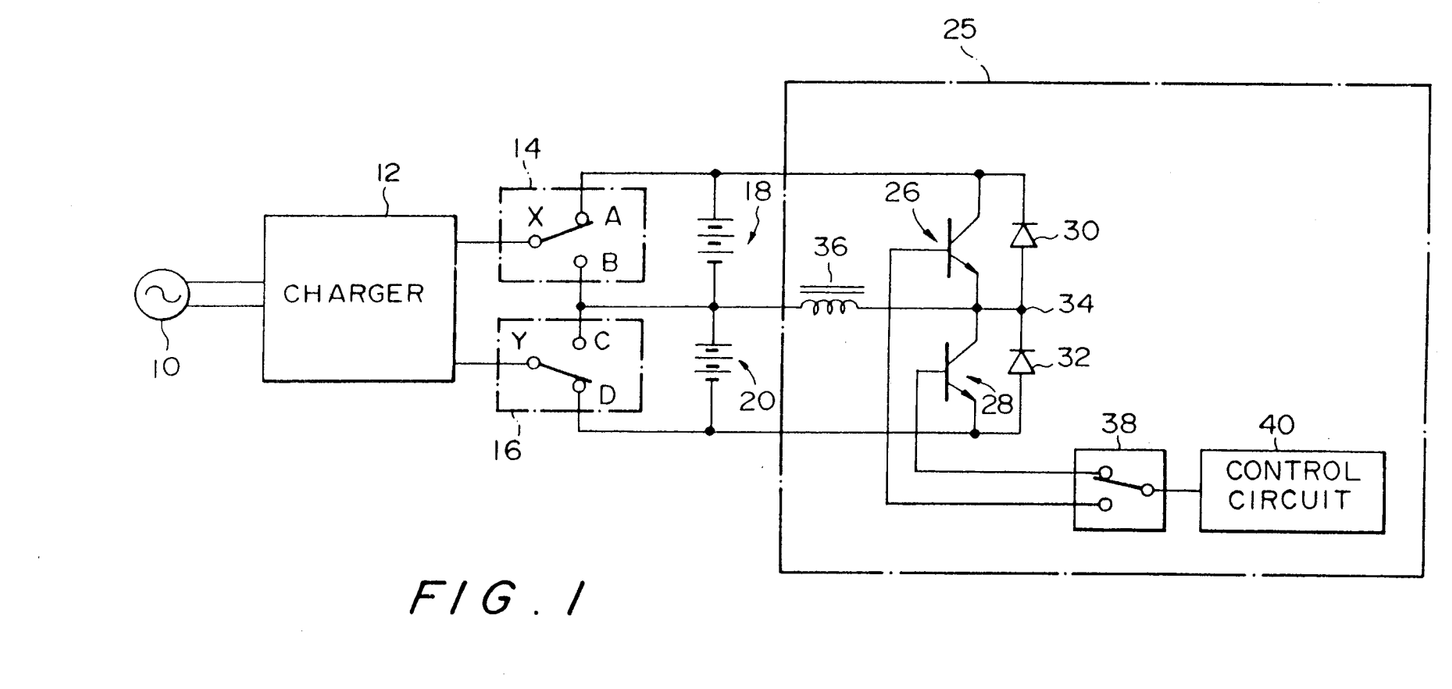
FIG. 1 shows the structure of a first embodiment of an apparatus which adopts a method of charging and discharging a battery according to the present invention, under the battery charging condition.
Figure 2:
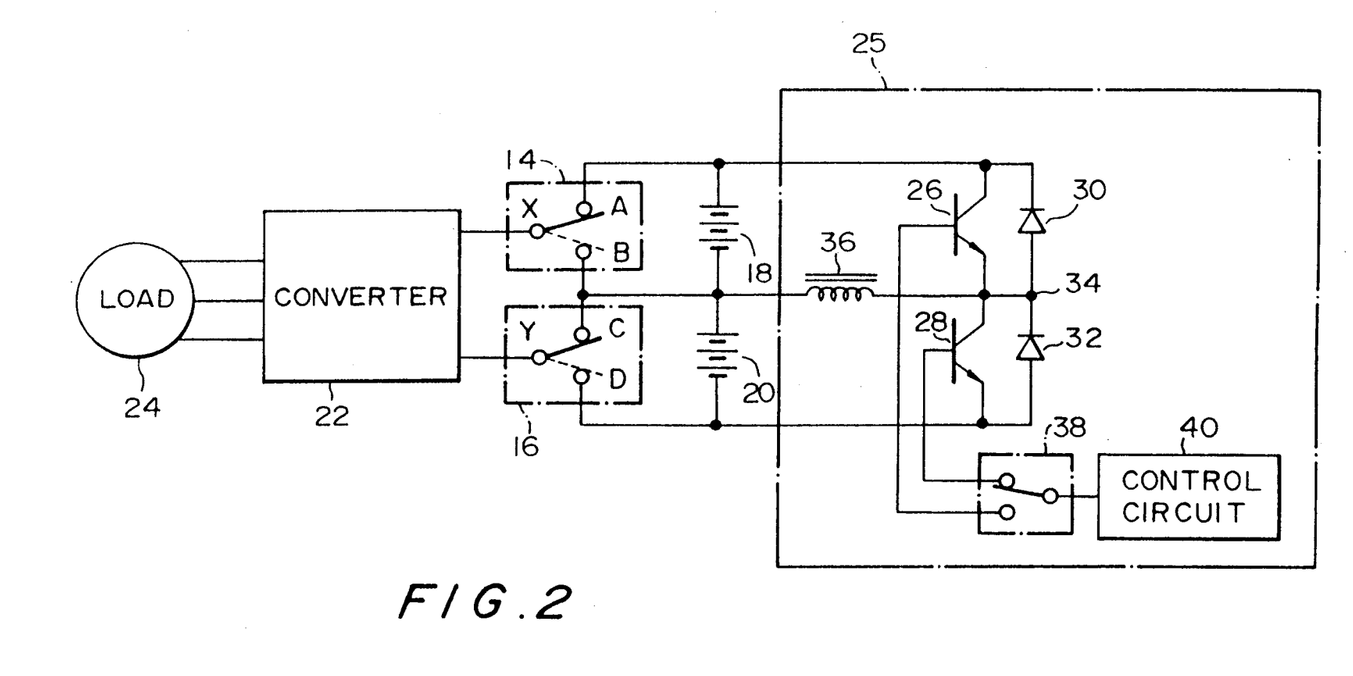
FIG. 2 shows the structure of the first embodiment shown in FIG. 1, in the state of discharging the battery.
Figure 3A:
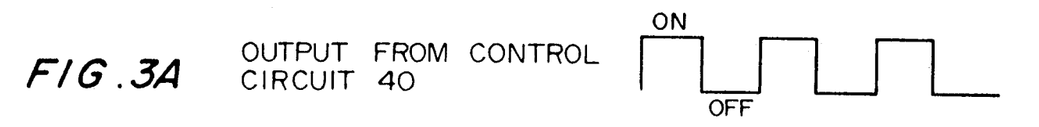
FIGS. 3A-3A show the waveforms of the voltage and the current at each point of the first embodiment shown in FIG. 1.
Figure 3B:
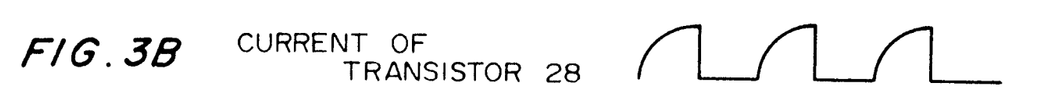
Figure 3C:
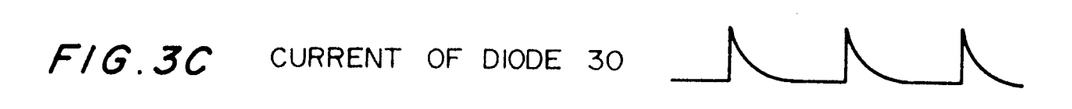
Figure 3D:
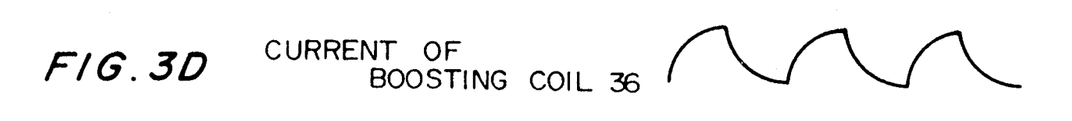

FIGS. 1 and 2 show a first embodiment of an apparatus which adopts a method of charging and discharging a battery according to the present invention.

FIG. 1 shows the structure of the apparatus in a state of charging the battery in order to store energy therein, and FIG. 2 shows the structure of the apparatus in a state of discharging the battery in order to drive the load.

In FIG. 1, a charger 12 which is fed from a commercial power source 10 is connected to contactors 14 and 16. The contactors 14 and 16 have contacts A, B and C, D, respectively, which are switched from each other and connected to contacts X and Y, respectively.

Battery blocks 18 and 20 are connected to the contactors 14 and 16, respectively. That is, the positive terminal of the battery block 18 is connected to the contact A of the contactor 14, the negative terminal of the battery block 18 and the positive terminal of the battery block 20 are connected to the contacts B and C, and the negative terminal of the battery block 20 is connected to the contact D.

The AC power (generally 100 V or 200 V) supplied from the commercial power source 10 is converted into a predetermined DC power by the charger 12. If the contact X of the contactor 14 is connected to the contact A and the contact Y of the contactor 16 is connected to the contact D, a predetermined DC power is supplied to the battery blocks 18 and 20 which are connected in series to each other, thereby charging the battery blocks 18 and 20.

On the other hand, in order to discharge the battery for feeding a load, a power converter 22 is connected to the contactors 14 and 16, and to the power converter 22 a load 24 such as a motor is connected, as shown in FIG. 2.

If the contact X of the contactor 14 is connected to the contact A and the contact Y of the contactor 16 is connected to the contact C, the power of the battery block 18 is supplied to the load 24 through the power converter 22, while the power of the battery block 20 is supplied to the load 24 through the power converter 22 when the contact X of the contactor 14 is connected to the contact B and the contact Y of the contactor 16 is connected to the contact D. The power converter 22 is composed of a chopper, an inverter and the like, and supplies the DC power from the battery block 18 or 20 to the load 24 such as an induction motor in the form of a predetermined AC power.

It is possible to subsequently supply the DC power from the battery blocks 18 and 20 by switching the contactors 14 and 16.

In this embodiment, the apparatus is further provided with a booster circuit 25 as a booster means. That is, transistors 26 and 28 and diodes 30 and 32 are connected to the battery blocks 18 and 20.

More specifically, the collector of the transistor 26 is connected to the positive electrode side of the battery block 18, the emitter of the transistor 28 is connected to the negative electrode side of the battery block 20, and the connecting portion of the collector and the emitter of the transistors 26 and 28 is connected to the connecting portion of the battery blocks 18 and 20. The diodes 30 and 32 are disposed in such a manner as to prevent a short-circuit current from flowing from the positive electrode of the battery block 18 to the negative electrode of the battery block 20.

The connecting point of the transistors 26 and 28 and the connecting point 34 of the diodes 30 and 32 are connected to the connecting portion of the battery blocks 18 and 20 through a boosting coil 36. The transistors 26 and 28 are turned on and off in accordance with a signal supplied from a control circuit 40 through a switch 38. The control circuit 40 includes a rectangular wave oscillator such as a multivibrator which is capable of adjusting a pulse width and pulse frequency and controls the on/off operation of the transistors 26 and 28.

The charging operation for storing energy in the battery blocks 18 and 20 and the discharging operation for supplying a power to the load 24 in this embodiment will now be explained.

At the time of charging, the battery blocks 18 and 20 are connected in series and a power which is adjusted to predetermined current and voltage is supplied thereto from the charger 12 so as to charge the battery as a whole. When the charging of either of the battery blocks 18 and 20 has been completed, the contacts of the contactors 14 and 16 are switched so as to charge the other battery block solely. It is necessary to lower the voltage supplied to half the initial voltage simultaneously with the switching operation.

In the discharging state for supplying a power to the load 24, the power is subsequently supplied from the battery blocks 18 and 20 to the load 24 through the power converter 22.

In this embodiment, full discharge for equalization of either of the battery blocks 18 and 20 is enabled by the following operation whether the battery blocks 18 or 20 is supplying a power to the load 24 or they are not operated.

A rectangular wave signal is supplied from the control circuit 40 to either of the transistors 26 and 28 through the switch 38. The signals is supplied to the base of either of the transistors 26 and 28 so as to turn on and off the transistor.

In FIG. 2, when the rectangular wave signal is supplied to the transistor 28 through the switch 38, as indicated by the solid line, the transistor 28 is turned on and off, thereby short-circuiting between the positive electrode and the negative electrode of the battery block 20 at a predetermined period. When a short-circuit is caused between the positive electrode and the negative electrode in this way, a current begins to flow from the positive electrode of the battery block 20 to the boosting coil 36 and the energy proportional to the square of the short-circuitting time is stored therein. When the transistor 28 is turned off in accordance with a rectangular wave signal from the control circuit 40, the power stored in the boosting circuit 36 raises the potential of the connecting point 34 of the diodes 30 and 32, and flows to the positive electrode side of the battery block 18 through the diode 30, thereby charging the battery block 18.

Repetitions of this operation subsequently pumps out the power remaining in the battery block 20 and transfers it to the battery block 18. Thus, it is possible to achieve the full discharge of the battery block 20 without wasting the power remaining in the battery block 20.

FIGS. 3A–3D show the state of the rectangular wave which is output from the control circuit 40, and the changes in the current values of the transistor 28, the diode 30 and the boosting coil 36 in accordance with the rectangular wave. It is understood from FIG. 3, that the current value of the transistor 28 gradually rises and when the current value becomes zero, a charge current flows to the battery block 18 through the diode 30.

In this embodiment, two battery blocks are provided and they are discharged alternately, but the number of battery blocks is not limited to two, and a combination of three battery blocks or more may be usable. For example, when the voltage of one block is E volt and an output voltage to be obtained is $E \times N$ volts, N battery blocks are provided. A power is transferred from the n-th battery block to the (n-1)-th battery block to fully discharge the n-th battery block. Repetitions of such full discharge on a predetermined cycle subsequently enables the full discharge of all the battery blocks.

The timing for full discharge is independent of the state in which the battery supplies a power to the load. For example, when the contact X of the contactor 14 is connected to the contact A and the contact Y of the contactor 16 is connected to the contact C, as indicated by the solid lines in FIG. 2 and a power is supplied from the battery block 18 to the load 24 through the power converter 22, if a rectangular wave signal from the control circuit 40 is supplied to the base of the transistor 28 through the switch 38, the transistor 28 is turned on or off and the battery block 20 is discharged to supply a power to the battery block 18, as described above.

The charged and discharged states of the battery blocks 18 and 20 and the current supplied to the load 24 at this time will be explained with reference to FIG. 4. In order to achieve the full discharge for equalization in a short time, the discharge current of the battery block 20 is set at the maximum possible value A ampere by, for example, adjusting the on-off period of the transistor 28. If the current supplied to the load 24 is as small as B ampere, as shown by a symbol (a) in FIG. 4, the current of a magnitude equivalent to the difference, namely, (A−B) ampere is supplied to the battery block 18 as a charge current.

Figure 4:
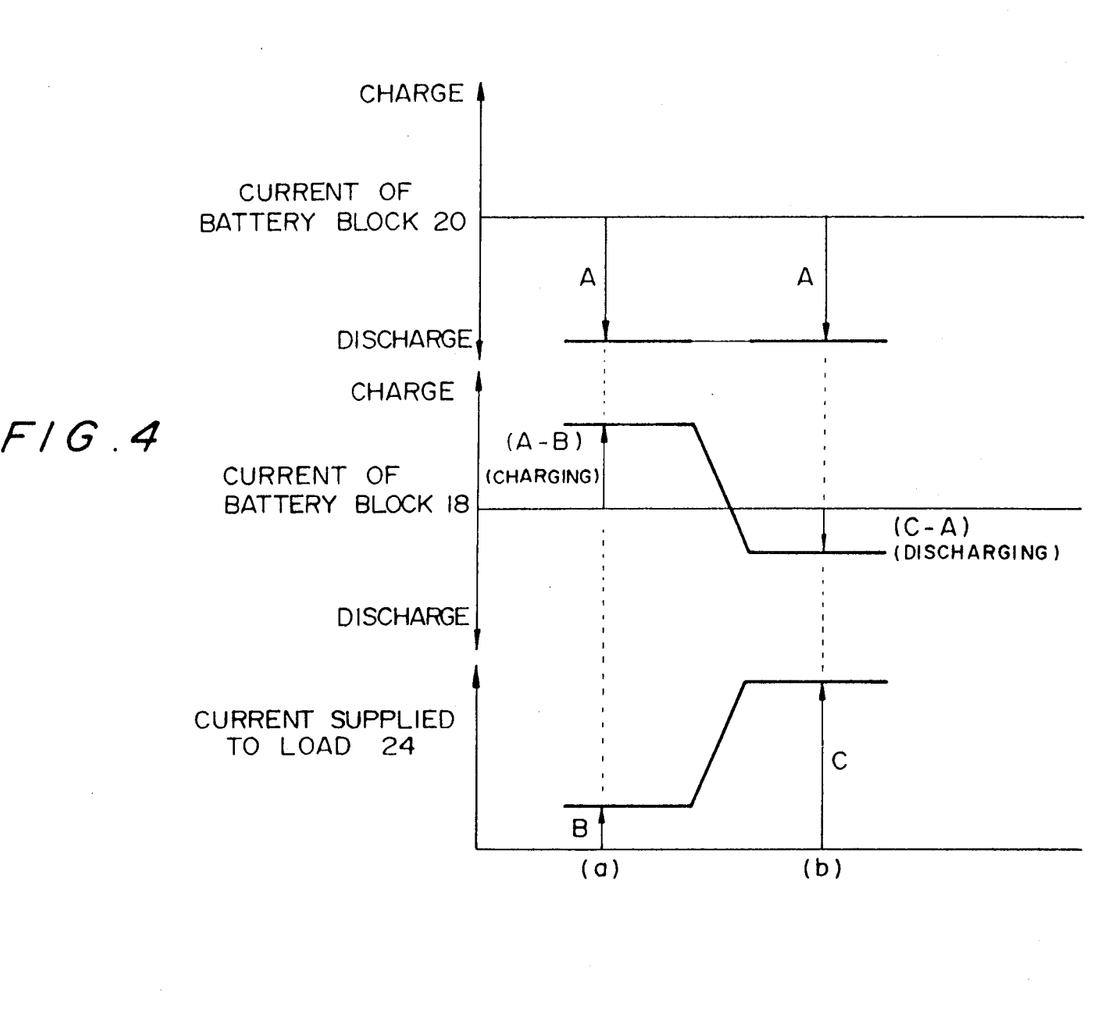
FIG. 4 shows the charged and discharged states of battery blocks in the first embodiment shown in FIG. 1.

When the current required for being supplied to the load 24 is larger than A ampere, namely, C ampere, as shown by a symbol (b) in FIG. 4, since the charge current of the battery block 20 is insufficient for the current to the load 24, the battery block 18 assumes the discharged state and supplies the current of a magnitude equivalent to the shortage, namely, (C−A) ampere. In this way, it is possible to discharge the battery block 20 at the maximum ampere A in spite of any state in which a power is supplied to the load 24.

Furthermore, it is possible to execute the full discharge for equalization irrespective of the remaining capacity of the battery blocks 18 and 20 and even if both battery blocks 18 and 20 are in a fully charged state. In the fully charged state, about 80% of the $Zn^{2+}$ ions and the $Br^-$ ions in the electrolyte based on those ions at the time of discharge are deposited and the ion concentrations become about 20%. In this state, if the transistor 28 is turned on and off in accordance with a rectangular wave signal from the control circuit 40 in FIG. 2 under the condition of power supply=0, the battery block 20 is discharged and on the side of the positive electrode thereof, $Br_2$ is dissolved in the electrolyte as $Br^-$ ions. As described above, since the electrolyte on the positive electrode side is common to the battery blocks 18 and 20, the $Br^-$ ions dissolved reach the positive electrode of the battery block 18, receive the charge current and deposit in the electrolyte as $Br_2$. Therefore, the concentration of $Br^-$ ions in the electrolyte is still 20%, in other words, the electrolyte is in the fully charged state.

On the negative electrode side, Zn on the electrode plate is dissolves into the electrolyte as $Zn^{2+}$ ions in the battery block 20. Since the electrolyte on the negative electrode side is also common to the battery blocks 18 and 20, the $Zn^{2+}$ ions dissolved reach the negative electrode of the battery block 18, receive the charge current and deposit on the electrode plate. In other words, on the negative electrode side, Zn on the electrode plate of the battery block 20 transfers onto the electrode plate of the battery block 18. Since the space between the electrode plates is generally much larger than the thickness of the layer of the deposited metal (plated layer), the deposition of Zn on the negative electrode in the battery block 18 is carried out without any obstacle. Accordingly, it is possible to fully discharge for equalization and complete dissolve Zn on the negative electrode plate even in the fully charged state.

As described above, since the full discharge of a battery is possible irrespective of the state in which a power is supplied to the load and the charged state of a battery block, full discharge for equalization can be carried out at any given timing and even while the battery is out of operation.

The charge current is detected by using a residual capacity meter for detecting the integrated value of charge and discharge current such as that described in, for example, Japanese Patent Laid-Open No. 28476/1981.

The fully discharged state of either of the battery blocks by the above-described operation is also detected by detecting that the terminal voltage of the battery block becomes zero when the transistor is OFF.

Second Embodiment

Figure 5:
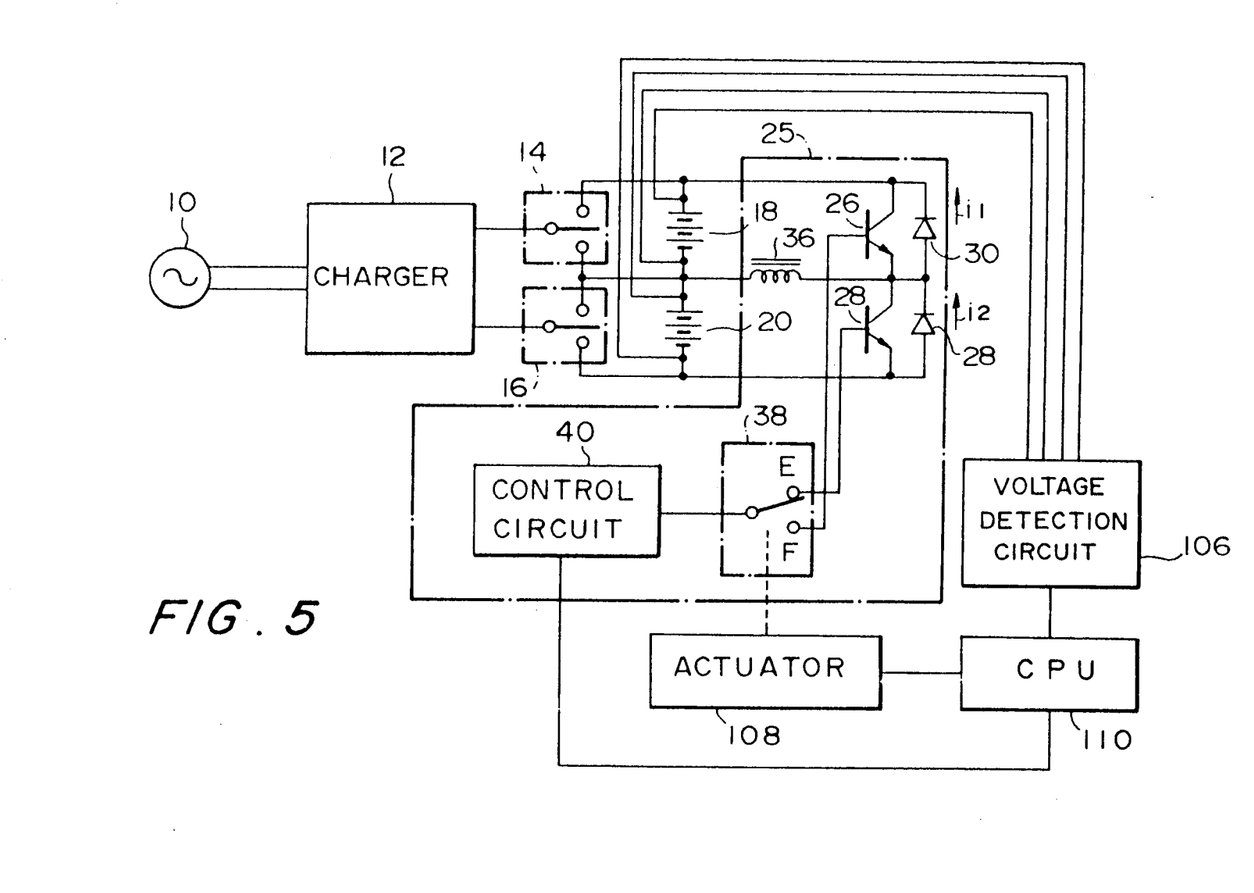
FIG. 5 shows the structure of a second embodiment of an apparatus according to the present invention.

Another embodiment of an apparatus of the present invention is shown in FIG. 5. This embodiment is provided with a voltage detection circuit 106 for detecting the terminal voltage of battery block 18 and the terminal voltage of the battery block 20. A signal from the control circuit 40 is supplied to the base of the transistor 26 or the transistor 28 in the same way as in the first embodiment, but the switch 38 provided between the control circuit 40 and the transistors 26 and 28 is controlled by a CPU 110 through an actuator 108.

Addition of these elements can prevent the deterioration of the battery even if it is left unoperated for a long time.

More specifically, when the full discharge of either of the battery blocks 18 and 20 is detected by detecting the terminal voltage, charge and discharge of the battery blocks 18 and 20 are inverted. Repetition of this operation can achieve the full discharge of both battery blocks alternately, thereby keeping the amounts of charge of the electrochemical cells in each block uniform.

Figure 6:
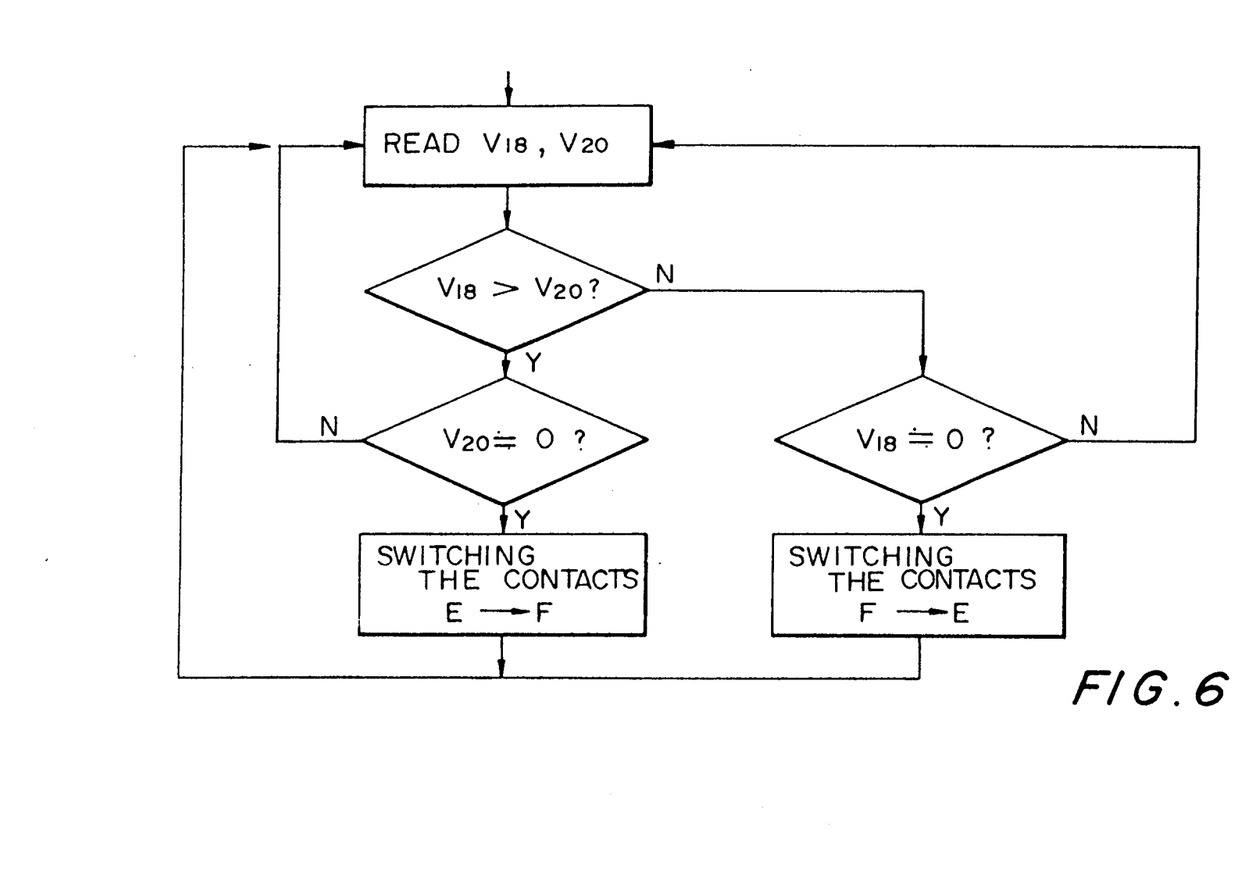
FIG. 6 is a flow chart of the operation of a CPU 110 in the second embodiment shown in FIG. 5.

The operation of the CPU 110 in this apparatus will now be explained with reference to FIG. 6. The values of the terminal voltage $V_{18}$ of the battery block 18 and the terminal voltage $V_{20}$ of the battery block 20 are first read by the voltage detection circuit 106. The values of $V_{18}$ and $V_{20}$ are compared with each other. If the terminal voltage $V_{18}$ is larger than $V_{20}$, it represents that the contact E of the switch 38 is closed and a power is being transferred from the battery block 20 to the battery block 18. The terminal voltage $V_{20}$ is then compared with the predetermined minimum voltage ($\approx 0$ volt). This operation is repeated until $V_{20}$ becomes smaller than the minimum value.

Since that the terminal voltage $V_{20}$ becomes substantially 0 volt represents that the remaining power is substantially zero, in other words, that the full discharge has been achieved, the contacts of the switch 38 are switched from E to F. In this way, the transfer of the power from the battery block 20 to battery block 18 is finished, and the transfer of the power from the battery block 18 to battery block 20 is started in turn. In this state, if $V_{18}$ and $V_{20}$ are compared with each other, since the contact F of the switch 38 is closed and a power is being transferred from the battery block 18 to the battery block 20, $V_{20}$ is larger than $V_{18}$. The terminal voltage $V_{18}$ is then compared with the predetermined minimum voltage ($\approx 0$ volt) When $V_{18}$ becomes substantially 0 volt, the switch contacts are switched from F to E. Incidentally, it is possible to provide a predetermined suspension period in which both E and F are open immediately after $V_{18}$ or $V_{20}$ becomes substantially 0 volt and before the contacts are switched between E and F.

In this way, by subsequently transferring the powers stored in the battery blocks 18 and 20, the electrochemical cells of the battery blocks 18 and 20 are subsequently fully discharged, whereby all the electrochemical cells assume a uniform state free from deterioration. That is, it is possible to keep the amount of charge of each of the electrochemical cells constituting the battery blocks 18 and 20 uniform, as shown in FIG. 7. Such full discharge may be carried out not only in accordance with the detection of the terminal voltages of the battery blocks but also intermittently, for example, by the control of a timer.

Third Embodiment

Figure 8:
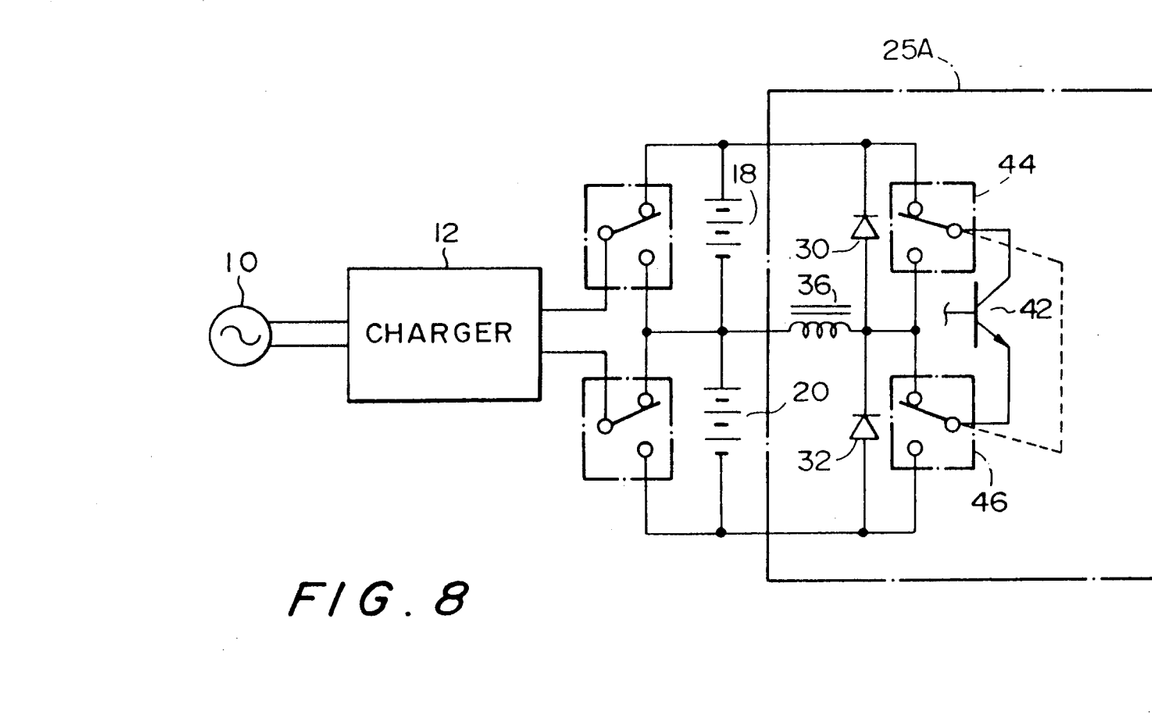
FIG. 8 shows the structure of a third embodiment of an apparatus according to the present invention.

Still another embodiment of an apparatus of the present invention is shown in FIG. 8. This embodiment is characterized in that a booster circuit 25A has a different structure from that of the booster circuit 25 in the first embodiment. One transistor 42 is adopted in place of the transistors 26 and 28 in the first embodiment.

A signal from the control circuit 40 is supplied to the base of the transistor 42 in the same way as in the first embodiment. The collector and the emitter of the transistor 42 are connected to the switches 44 and 46, respectively. Therefore, if the switches 44 and 46 are connected as shown in FIG. 8, the transistor 42 constitutes a circuit for short-circuitting between the positive electrode and the negative electrode of the battery block 18. By turning on and off the transistor 42, the power remaining in the battery block 18 is transferred to the battery block 20. If the switches 44 and 46 are connected to the opposite side to the side shown in FIG. 8, the power in the battery block 20 is transferred to the battery block 18.

Fourth Embodiment

Figure 9:
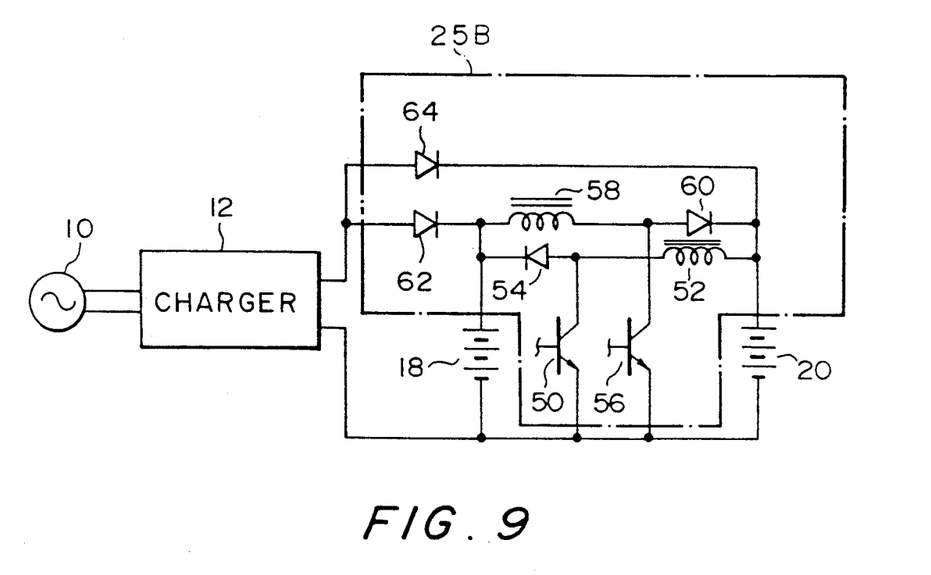
FIG. 9 shows the structure of a fourth embodiment of an apparatus according to the present invention.

A further embodiment of an apparatus of the present invention is shown in FIG. 9. In this embodiment, the battery blocks 18 and 20 are disposed in parallel. A booster circuit 25B has a transistor 50, a boosting coil 52 and a diode 54 for transferring the power remaining in the battery block 20 to the battery block 18 and a transistor 56, a boosting coil 58 and a diode 60 for transferring a power from the battery block 18 to the battery block 20.

By turning on and off the transistor 50, the power in the battery block 20 is stored in the boosting coil 52 and then transferred to the battery block 18 through the diode 54 so as to be utilized for charging the battery block 18. If the transistor 56 is turned on and off, the power in the battery block 18 is transferred to the battery block 20.

The diodes 62 and 64 prevent a power from flowing backward to the charger 12 during the above-described transfer of the power.

The parallel arrangement of the battery blocks makes the control circuit slightly complicated, but brings about advantages such as a low terminal voltage and a small self discharge.

Fifth Embodiment

Figure 10:
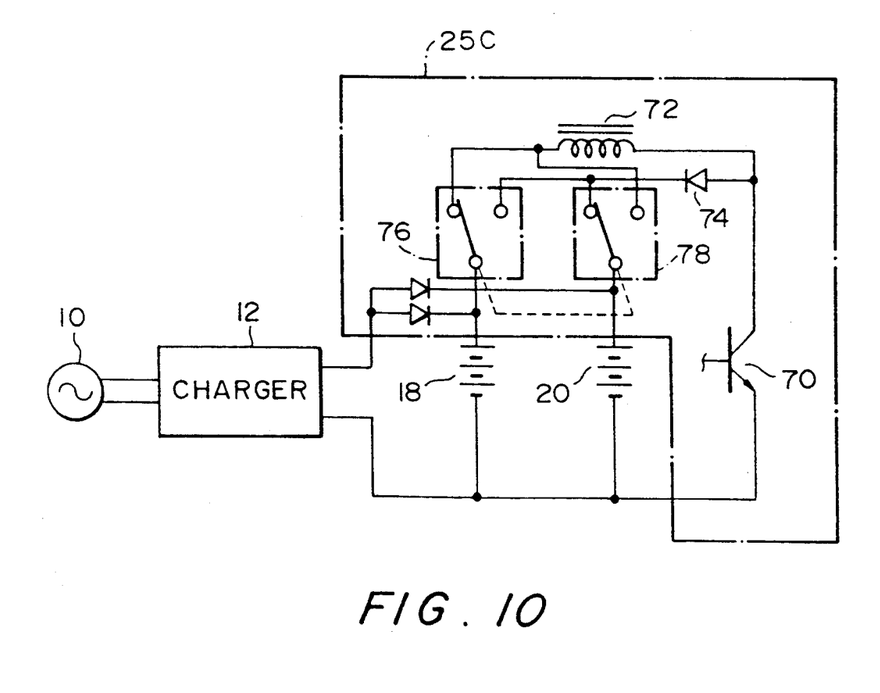
FIG. 10 shows the structure of a fifth embodiment of an apparatus according to the present invention.

A modification of the fourth embodiment shown in FIG. 9 is shown in FIG. 10. The booster circuit 25 is replaced by a booster circuit 25C having a different structure. A transistor 70 is used in place of the transistors 50 and 56, a boosting coil 72 is used in place of the boosting coils 52 and 58 and a diode 74 is used in place of the diodes 54 and 60.

To execute a similar operation to that of the fourth embodiment, this embodiment is provided with switches 76 and 78. By the change-over of the switches 76 and 78, the transfer of a power from the battery block 18 to the battery block 20 and the transfer of a power from the battery block 20 to the battery block 18 are switched from each other.

Sixth Embodiment

Figure 11:
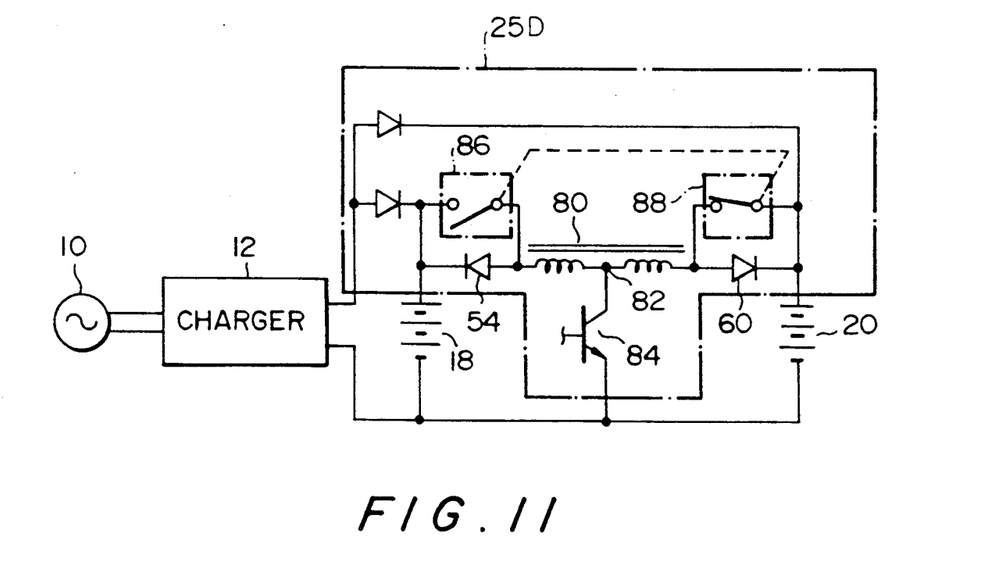
FIG. 11 shows the structure of a sixth embodiment of an apparatus according to the present invention.

In a further embodiment shown in FIG. 11, the booster circuit 25B shown in FIG. 9 is replaced by a booster circuit 25D, and the boosting coils 52 and 58 are replaced by a boosting coil 80. The boosting coil 80 has a center tap 82, which is connected to a transistor 84. Switches 86 and 88 for bypassing the diodes 60 and 54 are provided, and by the change-over of the switches 86 and 88 the direction of the transfer of a power is switched. This embodiment also enables the transistors 50 and 56 and the boosting coils 52 and 58 to be replaced by one transistor and one boosting coil.

As described above, according to a method of charging and discharging a battery of the present invention, it is possible to subsequently achieve the full discharge of the battery blocks for equalization by transferring the power of one battery block to the other battery block, thereby greatly ameliorating the deterioration of the battery and, hence, regulating the loss of the power.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method of charging and discharging a battery having a plurality of electrochemical cells which dissolve in active material from the electrodes into the electrolyte in the discharging process and deposit said active material on the surfaces of said electrodes in the charging process, said method comprising:
   preparing said battery by preparing a plurality of battery blocks, each of which is composed of a plurality of said electrochemical cells connected in series with each other;
   a step of fully discharging any one battery block among said plurality of battery blocks by transferring the charges of said one battery block to at least one of the other battery blocks through a boosting means; and
   repeating said step so that all of said plurality of battery blocks subsequently experience at least one cycle of full discharge within a predetermined period of time.

2. A method according to claim 1, wherein said boosting means includes a boosting coil and a transistor connected in series with each other and disposed in a path for short-circuiting both terminals of said one of said plurality of battery blocks, and said step comprises turning on and off said transistor to short circuit said terminals.

3. A method according to claim 1, wherein said step for fully discharging said one battery block is finished when both terminal voltages of said battery block become zero.

4. A method according to claim 1, wherein said step for fully discharging said one block is repeated at every second predetermined period of time while an electric vehicle is stopped.

5. A power source apparatus comprising:
   electrochemical cells for dissolving an active material from the electrodes into the electrolyte in a discharging process and depositing said active material on surfaces of said electrodes in a charging process;

battery blocks each of which is composed of a plurality of said electrochemical cells connected in series with each other;

a battery composed of a plurality of said battery blocks connected to each other;

a booster means which is connected to any given battery block among said plurality of blocks for raising an output voltage of said given battery block;

a charge transfer passage for connecting an output of said booster means to at least one of the other battery blocks; and a control circuit for controlling said booster means and the charges transferred through said charge transfer passage;

whereby each of said battery blocks is fully discharged within a predetermined period of time.

6. A power source apparatus according to claim 5, wherein said booster means includes a boosting coil and a transistor disposed in a path for connection to terminals of said battery blocks.

7. A power source apparatus according to claim 6, wherein said control circuit has a multivibrator for intermittently turning on said transistor.

8. A power source apparatus according to claim 5, wherein said charge transfer passage has a diode which is disposed in a path for connecting terminals of said given battery block and flows a current only toward the positive electrode thereof.

9. A power source apparatus according to claim 5, wherein said battery is composed of two of said battery blocks connected in series with each other;

one terminal of said booster means is connected to said battery blocks; and two sets of transistors and diodes connected in parallel are disposed between the other terminal of said booster means and both terminals of said battery;

said transistors and said diodes flowing a current from the positive electrode to the negative electrode of the respective battery blocks.

10. A power source apparatus according to claim 9, further comprising a switch for selecting either of said transistors and supplying an on/off signal from said control circuit to the selected transistor.

11. A power source apparatus according to claim 10, further comprising a voltage detection circuit for detecting a voltage of each of said two battery blocks, and said control circuit and said switch are controlled in accordance with a value from said voltage detection circuit so as to turn on and off said selected transistor.

12. A power source apparatus according to claim 5, further comprising a boosting coil, one terminal of which is connected to the negative electrode of one battery block and the positive electrode of the other battery block;

diodes for flowing a current from the positive electrode to the negative electrode of each battery block;

switches connected in parallel with each of the diodes, each switch leading one terminal of each of said diodes to an external connection, said one terminal being switchable by operation of said switches; and a transistor for connection to terminals of said switches;

said diodes, said switches and said transistor being disposed in a path leading between the other terminal of said boosting coil, and those electrodes of said battery blocks which are not connected to each other or to the boosting coil to said one terminal of said boosting coil; and said transistor being switched to be connected in parallel with one of said diodes by the operation of said switches.

13. A power source apparatus according to claim 5, wherein said battery is composed of two of said battery blocks connected in parallel to each other; and two connection paths between the positive electrodes of the two battery blocks are provided with a first boosting coil and a first diode connected to said first boosting coil;

a second boosting coil and a second diode connected to said second boosting coil for flowing a current in the opposite direction to the direction in which current flows in said first diode;

said first boosting coil and said first diode being connected in parallel with said second boosting coil and said second diode;

a connecting point of said first boosting coil and said first diode being connected to the negative electrode of one of said two battery blocks by a first transistor;

a connecting point of said second boosting coil and said second diode being connected to the negative electrode of the other of said two battery blocks by a second transistor;

the first transistor flowing a current from the positive electrode to the negative electrode of said one of the said two battery blocks;

the second transistor flowing a current from the positive electrode to the negative electrode of said other of said two battery blocks.

14. A power source apparatus according to claim 5, wherein said battery is composed of two of said battery blocks;

electrodes selected from positive electrodes and negative electrodes of said two battery blocks are connected to each other so as to form a common terminal;

electrodes of either one of said two battery blocks other than said electrodes which form part of said common terminal are connected to said common terminal by a boosting coil and a transistor, said transistor flowing a current from the positive electrode to the negative electrode of said one battery block;

a connecting point of said boosting coil and said transistor is connected to the positive electrode of the other of said two battery blocks through a diode, said diode flowing a current from the positive electrode to the negative electrode of said other block; and a switch for subsequently switching between said battery block which is connected to said boosting coil and said battery block which is connected to said diode.

15. A power source apparatus according to claim 5, wherein said battery is composed of two of said battery blocks;

electrodes selected from positive electrodes and negative electrodes of said two battery blocks are connected to each other so as to form a common terminal;

other terminals which are opposite said common terminals of said two battery blocks, are connected to each other by the series connection of the following four members:

a first diode for flowing a current in one direction, a first boosting coil connected to said first diode, a second boosting coil connected to said first boosting coil and a second diode connected to said second boosting coil and flowing a current in the opposite direction to the direction in which said first diode flows said current;

a transistor for controlling a current to flow from the positive electrode to the negative electrode of said battery blocks is provided between a connecting point of said first and second boosting coils and said common terminal of said blocks; and further comprising switches, coupled to said first and second diodes for short-circuiting a diode selected from the group consisting of said first diode and said second diode.

\* \* \* \* \*